J. RUHLAND.
SOWING MACHINE.
APPLICATION FILED MAY 2, 1912.
1,058,468.
Patented Apr. 8, 1913.
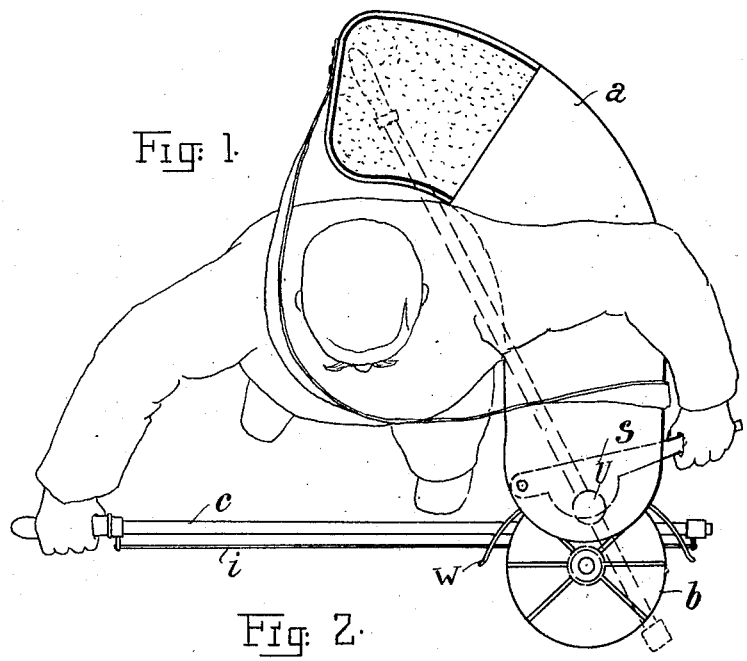
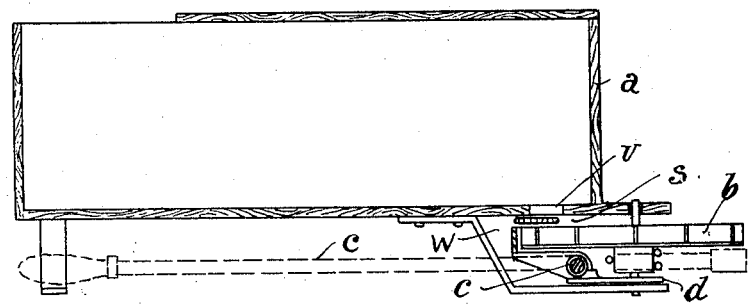
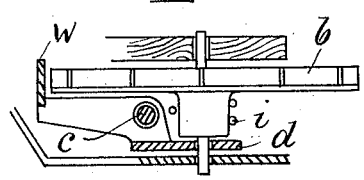

UNITED STATES PATENT OFFICE.

JOSEF RUHLAND, OF MUNICH, GERMANY, ASSIGNOR TO THE FIRM OF GEBR. WEIKERSHEIMER, OF MUNICH, GERMANY.

SOWING-MACHINE.

1,058,468.  Specification of Letters Patent.  Patented Apr. 8, 1913.

Application filed May 2, 1912. Serial No. 694,720.

*To all whom it may concern:*

Be it known that I, JOSEF RUHLAND, a citizen of Germany, residing at Munich, Bavaria, Germany, have invented certain new and useful Improvements in Sowing-Machines; and I do hereby declare the following to be a full, clear, and exact description of the invention, such as will enable others skilled in the art to which it appertains to make and use the same.

My invention relates particularly to a hand broadcast seeder embodying a distributing disk, and a suitable operating cord.

The broadcast seeder according to the present invention is of that kind in which the seeds run from a receptacle, carried by the operator, onto a winged disk, which is rapidly oscillated by cord power and the seed thereby distributed.

Figure 1 shows such an implement from above while in use. Fig. 2 is a longitudinal section. Figs. 3 and 4 are details.

In the hand broadcast seeder according to the present invention the cord power consists of a strong rod $c$ which carries the driving cord $i$ which is wound around the axle of the distributing disk $b$. By the to and fro swinging of the rod $c$ the disk is rapidly oscillated.

It was a great drawback in the known form of this implement that when it was not in use the cord had to be detached and the rod removed from its bearings, as there was otherwise danger that in transporting or taking off the implement the rod on account of its spreading shape would be broken or bent. Also in putting the motive power in operation again the cord was wound around the axle of the disk in a wrong way, toward the front instead of toward the back, whereby the power in working became wedged or the cord broke.

The purpose of the present invention is to do away with these difficulties and disadvantages.

In the present invention the carrying arms of the rod $c$ rest on a support $d$ (Fig. 2) which is movable in the middle of the axle $b$ of the distributing disk (Figs. 3 and 4). In this simple way it is possible without any disturbance of the connections to simply turn the rod $c$ after use under the receptacle, as is shown in Figs. 1, 2 and 4 with dotted lines, in which position the rod would not be in the way in transporting or taking off the implement. It has, however, the advantage that the driving of the disk $b$ is much smoother and easier and it diminishes the wear and tear of the bearings of the rod and of the rod itself as the rod can yield at once to every lateral pressure and is subjected to less friction. The attaching and detaching of the cord $i$ is no longer necessary, whereby the use by less skilful workmen is much simplified. There is further nothing more necessary than to turn the rod forward in order to be able to begin work at once.

U is the supply opening for the seeds. S a cut-off to regulate or stop the supply during the work.

The distributing disk is bounded at the back by a circular, bent guard $w$ which directs the seeds thrown by the disk $b$ forward. This guard $w$ is firmly attached to the movable support $d$ of the power rod $c$ (Figs. 2 and 3, side views in section, Fig. 4 view from above). In consequence of this connection the guard $w$ moves with the rod $c$ when it is swung, whereby it is possible to change the distributing direction of the disk $b$ easily and at will. It is only necessary to swing the rod $c$ correspondingly.

The back part of the receptacle $a$ is so shaped that the whole receptacle lies as it were around the body of the operator in order to gain a receptacle as long as possible and containing a large quantity of seeds without being too heavy behind as would be the case with a straight form. In this way the carrying girth can be attached much better and more advantageously, so that among other things the position of the receptacle on the body is more comfortable and firmer.

What I claim as my invention is—

1. In a hand operated broadcast seed sower, the combination with the distributing disk and the shaft upon which the same is mounted, of an operating rod, a cord having its ends attached to said rod and being wound about the hub of said distributing disk, a support revoluble about said shaft and in which one end of said operating rod bears, and a seed guard secured to said support and movable therewith.

2. In a hand operated broadcast seed sower, the combination with a seed container having a seed outlet in one of its walls, of a cut-off for regulating the supply of seed from the container, a shaft carried by said container and a seed distributing disk revoluble on said shaft, a support revoluble about said shaft, said support having projecting arms and a guard carried at the ends of said arms, a rod having one end passing through said arms at a point adjacent said shaft, and an operating cord for the distributing disk having its ends secured to said rod and being wound about the hub of said disk.

In testimony whereof I hereunto affix my signature in the presence of two witnesses.

JOSEF RUHLAND.

Witnesses:
    JUSTIN ROTHSCHILD,
    RICHARD LUY.

Copies of this patent may be obtained for five cents each, by addressing the "Commissioner of Patents, Washington, D. C."